(12) United States Patent  (10) Patent No.: US 8,489,479 B2
Slater et al.  (45) Date of Patent: Jul. 16, 2013

(54) RISK SCORING SYSTEM AND METHOD FOR RISK-BASED DATA ASSESSMENT

(75) Inventors: Benjamin Anthony Slater, Lyneham (AU); Christopher P. Checco, Oakton, VA (US)

(73) Assignee: Accenture Global Services Limited, Dublin (IE)

( * ) Notice: Subject to any disclaimer, the term of this patent is extended or adjusted under 35 U.S.C. 154(b) by 277 days.

(21) Appl. No.: 12/845,901

(22) Filed: Jul. 29, 2010

(65) Prior Publication Data

US 2012/0030079 A1   Feb. 2, 2012

(51) Int. Cl.
*G06Q 40/00*  (2012.01)
(52) U.S. Cl.
USPC .......................................... 705/35; 705/36 T
(58) Field of Classification Search
USPC ....................................................... 705/36 T
See application file for complete search history.

(56) References Cited

U.S. PATENT DOCUMENTS

2001/0044734 A1* 11/2001 Walker et al. ...................... 705/4
2009/0234684 A1*  9/2009 Stoke et al. ........................ 705/7

OTHER PUBLICATIONS

Risk Based Scoring System Version 2.0 (RBSS v 2.0)—Privacy Impact Assessment PIA Date—Feb. 18, 2009.*
File-Tax Will Your Tax Return Be Audited? 2006 http://www.filetax.com/audit.html 6/.*
Wisconsin Dept. of Revenue Tax Compliance InfrastructureInfrastructureData Warehouse ProjectData ProjectJanna BaganzJanna BaganzAug. 6, 2007.*

* cited by examiner

*Primary Examiner* — William Rankins
(74) *Attorney, Agent, or Firm* — Finnegan, Henderson, Farabow, Garrett & Dunner, LLP

(57) ABSTRACT

Systems, methods, and computer program products are provided for determining risk. In one exemplary embodiment, there is provided a method for determining risk. The method may include receiving historical information relating to tax return data of a taxpayer. The method may also include updating one or more profiles associated with the historical information. The method may also include receiving current information relating to tax return data of the taxpayer. The method may also include querying the updated historical information based on the received current information. The method may further include processing historical information, received in response to the querying, together with the current information to generate one or more risk scores.

20 Claims, 5 Drawing Sheets

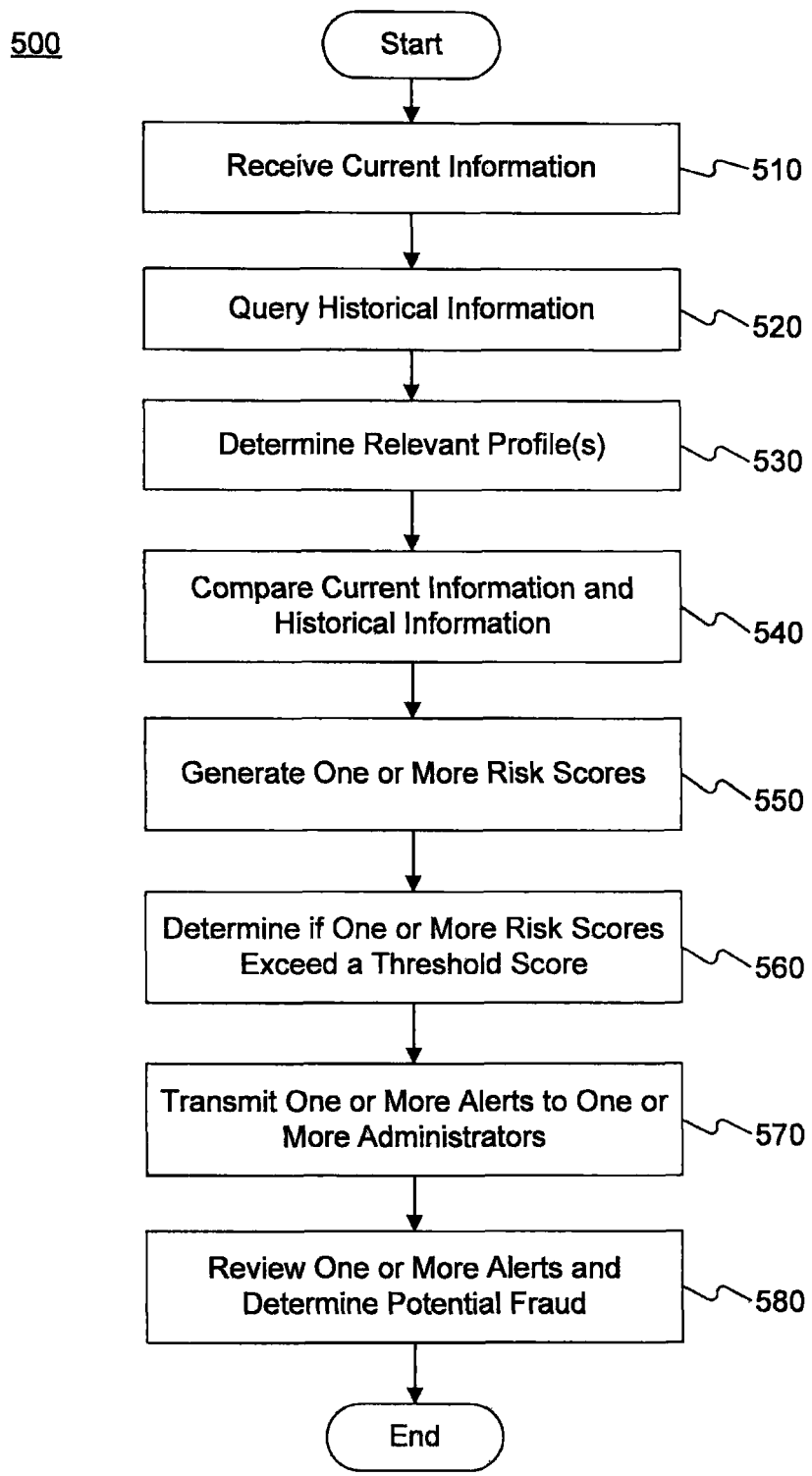

RISK SCORING SYSTEM AND METHOD FOR RISK-BASED DATA ASSESSMENT

TECHNICAL FIELD

The present disclosure generally relates to systems and methods for determining and scoring risk associated with fraud. More particularly, the present disclosure relates to systems and methods for receiving and processing tax return data and comparing current tax return data to historical tax return data to determine potential fraud.

BACKGROUND

Taxpayers, such as, for example, individuals and companies, may file income tax returns yearly. Based on a taxpayer's gross income and possible deductions and exemptions available, a taxpayer may either owe taxes or receive a refund for taxes paid during the year. Accordingly, it is common for a taxpayer to attempt to reduce his taxable income, and associated income tax liability, to either pay as little tax as possible or receive as large a tax refund as possible.

In order to reduce the amount of income tax liability, a taxpayer may, for example, deduct expenses that are not legally available, claim more dependents than allowed by law, fail to report all earned income, etc. These are examples of fraudulent actions that a taxpayer may take to reduce income tax liability. In addition, a taxpayer may purchase or steal one or more false identities and file fraudulent tax returns in an effort to receive a tax refund. These are other examples of fraudulent activity.

Such examples are prevalent and are increasingly common and difficult to catch by the tax receiving agency. For example, over 130 million tax returns were filed with the Internal Revenue Service ("IRS") in 2007. A corresponding number of tax returns were also filed in the corresponding state(s) of residence for each taxpayer. Therefore, the large volume of filed tax returns results in a large number of fraudulent tax returns that either improperly reduce the correct amount of taxes owed or improperly increase the amount of refunds owed.

One way to identify a fraudulent tax return would be to audit the return, e.g., by comparing it to previously filed returns, historical data, and other relevant information. When applying analytics to determine a fraud risk of a particular transaction (e.g. tax return processing), it is desirable to apply one or more risk rules to data contained in the transaction and/or a broad range of stored historical data. Current systems typically conduct all calculations required for risk scoring at the time of a transaction, e.g., when a tax return is received or when a batch of returns are audited.

In current systems, there is a need to employ increasingly sophisticated analytics as part of transaction processing to detect and prevent possible fraud. However, the ability to employ analytic techniques is often limited by the need to maintain very high standards of performance and reliability in the transaction processing system because sophisticated analytics require substantial processing power and add substantial complexity if executed in real time as a part of the transaction processing.

SUMMARY

In one exemplary embodiment, there is provided a method for determining risk. The method may include receiving historical information relating to tax return data of a taxpayer. The method may also include updating one or more profiles associated with the historical information. The method may also include receiving current information relating to tax return data of the taxpayer. The method may also include querying the updated historical information based on the received current information. The method may further include processing historical information, received in response to the querying, together with the current information to generate one or more risk scores.

In another exemplary embodiment, there is provided a computer-readable recording medium storing a computer-executable program which, when executed by a processor, performs a method for determining risk. The method may include receiving historical information relating to tax return data of a taxpayer. The method may also include updating one or more profiles associated with the historical information. The method may also include receiving current information relating to tax return data of the taxpayer. The method may also include querying the updated historical information based on the received current information. The method may further include processing historical information, received in response to the querying, together with the current information to generate one or more risk scores.

In another exemplary embodiment, there is provided a computer system for determining risk, including a computer having memory and a processor. The computer system may include one or more systems that may include data and a risk scoring center in communication with the one or more systems. The risk scoring center may receive historical information relating to tax return data of a taxpayer. The risk scoring center may update one or more profiles associated with the historical information. The risk scoring center may receive current information relating to tax return data of the taxpayer. The risk scoring center may query the updated historical information based on the received current information. The risk scoring center may also process historical information, received in response to the querying, together with the current information to generate one or more risk scores.

In another exemplary embodiment, there is provided a method for determining risk. The method may include receiving historical information relating to tax return data of a taxpayer. The method may also include updating one or more profiles associated with the historical information. The method may also include receiving current information relating to tax return data of the taxpayer. The method may also include querying the updated historical information based on the received current information. The method may also include processing historical information, received in response to the querying, together with the current information to generate one or more risk scores. The method may further include determining one or more profiles that are relevant to the current information based on the querying. The one or more profiles may include at least one of either a client profile, a preparer profile, an employer profile, a payment distribution profile, and a transaction segment profile, or any combination thereof, and the historical information may include tax return data associated with one or more previously filed tax returns.

It is to be understood that both the foregoing general description and the following detailed description are exemplary and explanatory only and are not restrictive of the disclosed systems and methods.

BRIEF DESCRIPTION OF THE DRAWINGS

The accompanying drawings, which are incorporated in and constitute a part of this disclosure, illustrate various embodiments and aspects of the present disclosure. In the drawings:

FIG. 5 illustrates a flowchart of an exemplary method for comparing current information with historical information to determine the risk of fraud consistent with an embodiment of the present disclosure.

DETAILED DESCRIPTION

Figure 1:
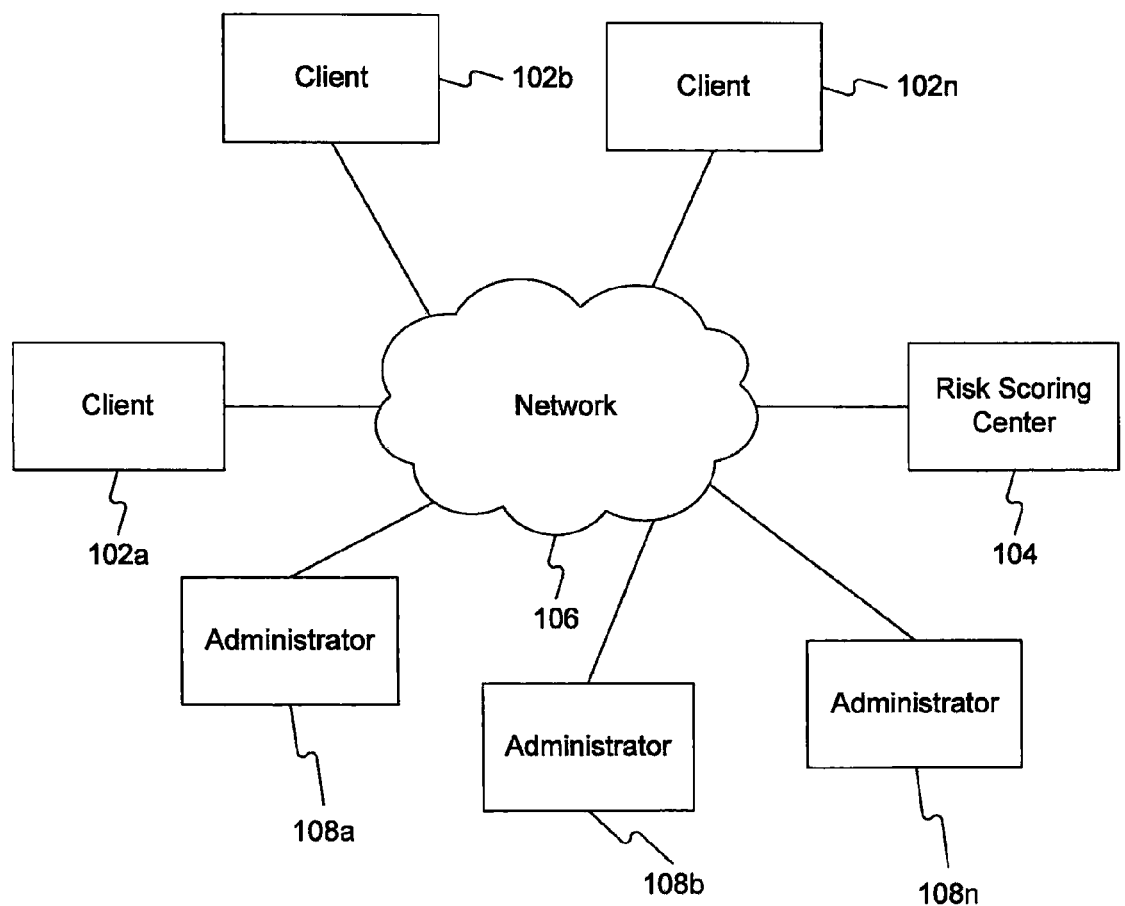
FIG. 1 illustrates an exemplary computing system that can be used to implement embodiments of the disclosure.

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure. Instead, the proper scope of the disclosure is defined by the appended claims.

Systems and methods consistent with the present disclosure move complexity from the time of transaction processing to a preprocessing stage which simplifies transaction processing, thus improving performance and reliability. Further, certain embodiments use a series of data structures or risk profiles corresponding to one or more entities to allow pre-calculated risk-relevant information to be stored and used to determine a risk score for a particular transaction. When a transaction requires risk scoring, a risk scoring engine may determine the particular profile(s) related to the transaction, and gather the profiles and transaction together to provide the necessary data to risk scoring rules.

In this way, systems consistent with the present disclosure may reduce complexity, thereby improving performance and reliability in risk scoring that occurs at the time a transaction is received without reducing the ability to apply sophisticated analytic techniques to detect fraud.

By way of a non-limiting example, FIG. 1 illustrates a system 100 in which the features and principles of the present disclosure may be implemented. The number of components in system 100 is not limited to what is shown, and other variations in the number of arrangements of components are possible, consistent with embodiments of the disclosure. The components of FIG. 1 may be implemented through hardware, software, firmware, etc. System 100 may include clients 102a, 102b, through 102n, risk scoring center 104, network 106, and administrators 108a, 108b, through 108n.

As illustrated in FIG. 1, clients 102a-102n may store tax return data and may communicate the data to risk scoring center 104 via network 106. Risk scoring center 104 may receive the data from clients 102a-102n, process the received data, generate one or more alerts regarding potential fraud associated with the received data, and send the processed data and one or more alerts to administrators 108a-108n. Administrators 108a-108n may review the one or more alerts regarding the potential risk of fraud in the tax return, conduct a more detailed analysis of the identified risk, determine if the taxpayer is attempting to fraudulently file the tax return, and perform other tasks related to reviewing the tax returns.

Network 106 provides communications between or among the various entities depicted in system 100. Network 106 may be a shared, public, or private network and may encompass a wide area network (WAN) or local area network (LAN). Network 106 may be implemented through any suitable combination of wired and/or wireless communication networks (including Wi-Fi networks, GSM/GPRS networks, TDMA networks, CDMA networks, Bluetooth networks, or any other wireless networks). By way of example, network 106 may be implemented through a wide area network (WAN), local area network (LAN), an intranet, and/or the Internet. Further, the entities of system 100 may be connected to multiple networks 106, such as, for example, to a wireless carrier network, a private data network, and the public Internet.

Clients 102a-102n may include one or more processors, such as, for example, computing devices. In an embodiment, clients 102a-102n may each include one or more databases that store data. The data may include, for example, tax return data for the current tax year. The tax return data may include, for example, a taxpayer's name, address, social security number, tax ID number, taxable income, number of exemptions, deductions, tax credits, etc. In addition to storing data regarding a taxpayer's tax return, one of ordinary skill would appreciate that clients 102a-102n may also store data regarding a joint tax return, tax returns for a company, and other such data.

Risk scoring center 104 may provide a platform for receiving data from clients 102a-102n and communicating with administrators 108a-108n. Risk scoring center 104 may be implemented using a combination of hardware, software, firmware, etc., and may be operable to receive and store data from various clients 102a-102n. For example, in an embodiment, risk scoring center 104 may receive data from clients 102a-102n regarding tax information.

Risk scoring center 104 may include one or more processors, such as, for example, computing devices. In an embodiment, risk scoring center 104 may contain one or more databases that store one or more tables of data. The data may include, for example, a taxpayer's name, address, social security number, tax ID number, taxable income, number of exemptions, deductions, tax credits, and other such data.

Risk scoring center 104 may also be operable to respond to requests for data. For example, administrator 108a may be a user that enters a request for data stored at risk scoring center 104. The request may include one or more triggering parameters, which can be used to find the requested data. When risk scoring center 104 receives a request for data from administrators 108a-108n, risk scoring center 104 may search a database for risk scoring center 104 and return the requested data, if found.

Risk scoring center 104 may also generate one or more alerts regarding possible fraud. For example, a taxpayer may attempt to fraudulently claim more dependents, lower taxable income, or more itemized deductions than appropriate. If the taxpayer's current tax return claims, for example, more dependents than previous tax returns, risk scoring center 104 may analyze the difference and determine if there is a risk of fraud associated with this difference. In an embodiment, risk scoring center 104 may generate one or more alerts based on the data received from clients 102a-102n.

Furthermore, risk scoring center 104 may employ a fast, scalable service to provide the requested data to administrators 108a-108n. The risk scoring center 104 may include a multi-data center fault tolerance service that may be available for query, even during large loads within system 100. In addition, or in an alternative embodiment, this service may be called by an application running on administrators 108a-108n instead of being integrated with a relational database.

Clients 102a-102n may provide users with an interface to network 106. By way of example, clients 102a-102n may be implemented using any device capable of accessing a data network, such as a general purpose computer or personal computer equipped with a modem or other network interface. Clients 102a-102n may also be implemented in other devices, such as a Blackberry™, Ergo Audrey™, mobile phones (with data access functions), Personal Digital Assistant ("PDA") with a network connection, IP telephony phone, or generally any device capable of communicating over a data network.

Users may use clients 102a-102n to transmit data to risk scoring center 104. In order to transmit data, the user may enter information on client 102a indicative of, for example, tax return data. After the user enters this information, client 102a may transmit the data to risk scoring center 104, which in turn may receive, store, and analyze the data in its database.

Figure 2:
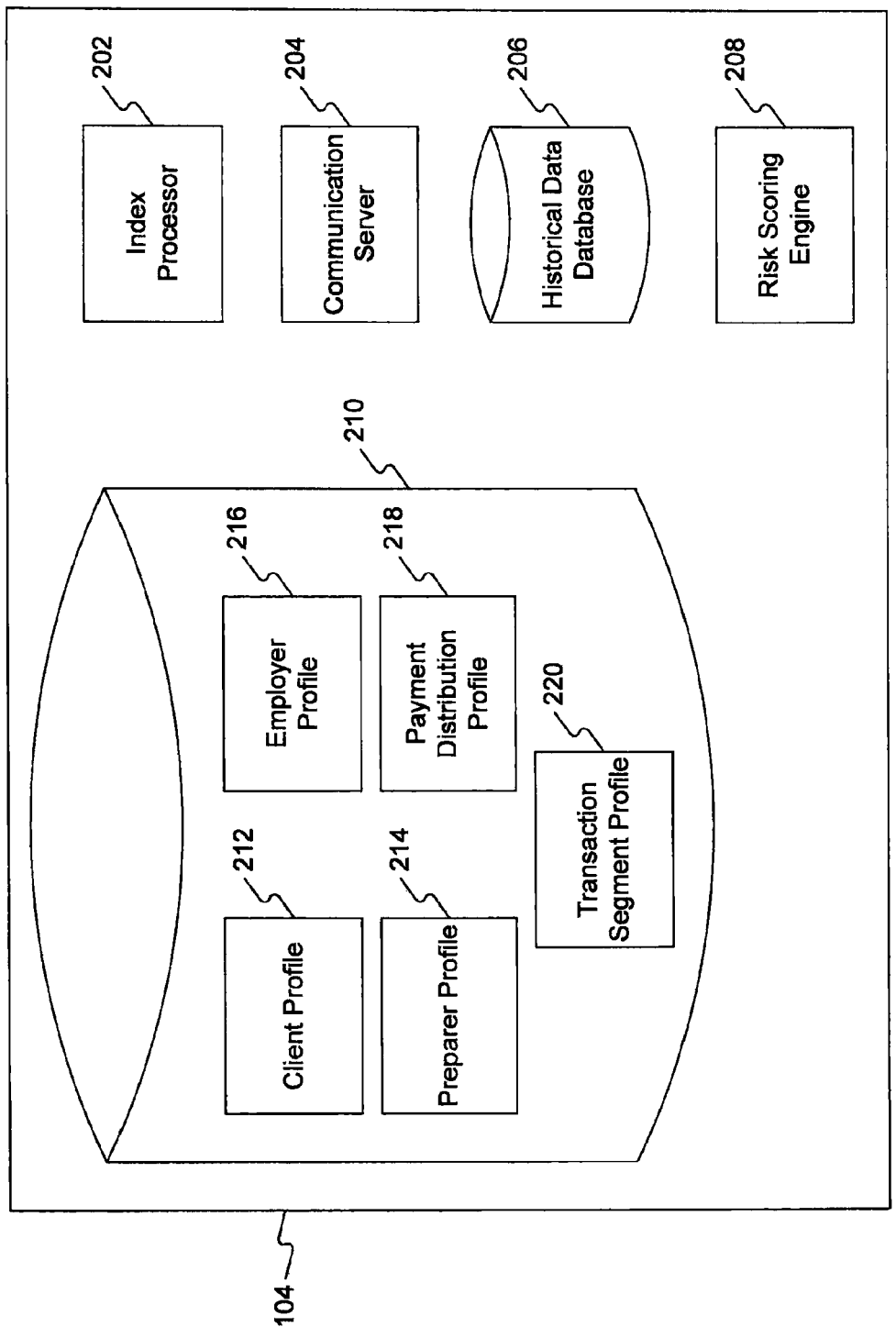
FIG. 2 illustrates an exemplary risking scoring component that can be used to implement embodiments of the disclosure.

FIG. 2 is a diagram of an exemplary risk scoring center 104 consistent with the present disclosure. For example, a tax authority may implement risk scoring center 104 to determine potential fraud associated with a tax return. Risk scoring center 104 may include at least an index processor 202, communication server 204, historical data database 206, risk scoring engine 208, and risk profile database 210. Risk profile database 210 may include client profile 212, preparer profile 214, employer profile 216, payment distribution profile 218, and transaction segment profile 220.

Index processor 202 may be one or more known processing devices, such as, for example, a microprocessor from the Pentium family manufactured by Intel™ or a mainframe-class processor. In an embodiment, index processor 202 may receive data from clients 102a-102n, process the received data, and may send the processed data to administrators 108a-108n, etc.

Communication server 204 may be a web server that provides functionality for receiving traffic over a network, such as the Internet. For example, communication server 204 may be a web server that a user may access at client 102a or administrator 108a using a web browser program, such as Safari, Internet Explorer, or Netscape Communicator. In an embodiment, communication server 204 is operable to receive data and requests for data, pass the requested data to the appropriate party, and provide other features.

In an embodiment, historical data database 206 may receive and store historical data regarding tax returns. For example, a taxpayer may file tax returns for one or more years. The tax return information filed in the past may be stored and used to determine possible fraud when compared to a current year tax return. The tax return information may include, for example, a taxpayer's name, address, social security number, tax ID number, taxable income, number of exemptions, deductions, tax credits, and other such data. By way of example, database 206 may be an Oracle™ database, a Sybase™ database, or other relational database.

Risk scoring engine 208 may query historical data database 206 to receive historical data for a taxpayer or from a plurality of taxpayers. For example, when a taxpayer files a tax return during the current tax year, risk scoring engine 208 may query historical data database 206 to receive the taxpayer's tax information from one or more previous tax returns.

This information may be useful to determine if a taxpayer is attempting to fraudulently claim, for example, more dependents, lower taxable income, or more itemized deductions than appropriate. For example, if the taxpayer's current tax return claims more dependents than previous tax returns, risk scoring engine 208 may analyze the difference and determine if there is a risk of fraud associated with this difference. Based on the identified risk, risk scoring engine 208 may determine a risk score indicating potential risk.

A plurality of risk scores may exist, and these risks scores may be stored in risk scoring engine 208. Furthermore, different types of risk may have different risk scores depending on the identified risk. In addition, each risk score may be compared with a risk score threshold that may be predetermined or customized. For example, each tax season different risk score thresholds may be determined. Conversely, risk score thresholds may be used, unchanged, between tax seasons.

Depending on the risk score determined by risk scoring engine 208, risk scoring engine 208 may determine if the score exceeds the threshold score. If the score exceeds the threshold score, risk scoring engine 208 may flag the tax return and send one or more alerts to entities such as, for example, one or more administrators 108a-108n. Administrators 108a-108n may review the one or more alerts regarding the potential risk of fraud in the tax return, conduct a more detailed analysis of the identified risk, determine if the taxpayer is attempting to fraudulently file the tax return, and perform other tasks related to reviewing the tax returns.

Risk profile database 210 may contain detailed information regarding tax returns and the historical information associated with taxpayers that file tax returns with the IRS. In the embodiment shown in FIG. 2, risk profile database is separate from historical data database 206. However, one of ordinary skill in the art would appreciate that risk profile database 210 may be contained within historical data database 206. Conversely, historical data database 206 may be contained within risk profile database 210.

As previously stated, risk profile database 210 may include client profile 212, preparer profile 214, employer profile 216, payment distribution profile 218, and transaction segment profile 220.

Client profile 212 may include, for example, information regarding the taxpayer who filed the tax return, such as the taxpayer's name, social security number, average income over past years, historically declared number of dependents, and other related data.

Preparer profile 214 may include, for example, summarized risk information regarding the potential tax preparers identified based on the historical data stored in historical data database 206, such as, for example, an individual preparer, H&R Block, Liberty Tax Service, etc. One of ordinary skill in the art would appreciate that if the taxpayer did not use an outside entity to assist in preparing the tax return, the preparer profile would not apply during risk scoring.

Employer profile 216 may include, for example, summarized risk information regarding the potential employers identified based on the historical data stored in historical data database 206. Payment distribution profile 218 may include, for example, summarized risk information regarding the potential bank accounts and mailing addresses for a refund check, if appropriate. Transaction segment profile 220 may include, for example, summarized risk information for potential tax payment amounts, refund amounts, or income details. Risk scores may relate to potentially risky characteristics, such as, for example, tax returns with a high number of deductions, a high number of exemptions, a high number of credits, or a reduced amount of taxable income.

Figure 3:
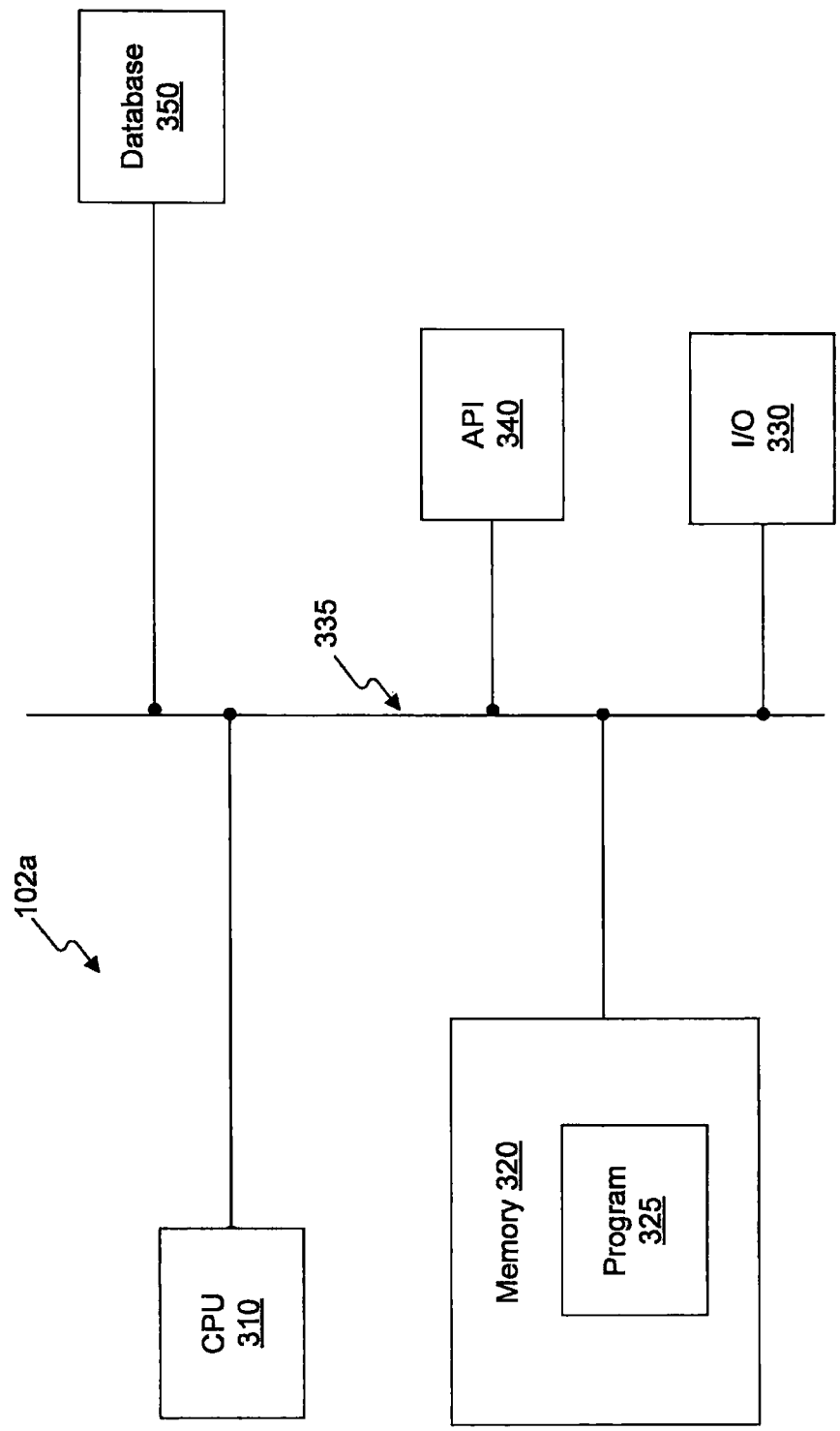
FIG. 3 illustrates an exemplary computing device that can be used to implement embodiments of the disclosure.

FIG. 3 illustrates an exemplary computing device 102a that can be used to implement embodiments of the disclosure. The components and arrangement, however, are not critical to the disclosure. One of ordinary skill will recognize that embodiments of the disclosure may be implemented by computers or workstations organized as shown, organized in a distributed processing system architecture, or organized in myriad suitable combinations of software, hardware, and/or firmware.

For example, client 102a may include components such as a central processing unit (CPU) 310, a memory 320, an input/output (I/O) device(s) 330, an application programming interface (API) 340, and a database 350 that can be implemented in various ways. For example, an integrated platform (such as a workstation, personal computer, laptop, etc.) may comprise CPU 310, memory 320, I/O devices 330, API 340, and database 350, interconnected by a local bus 335. In such a configuration, components 310, 320, 330, 340, and 350 may connect through a local bus interface.

CPU 310 may be one or more known processing devices, such as a microprocessor from the Pentium family manufactured by Intel™ or a mainframe-class processor. Memory 320 may be one or more storage devices configured to store information used by CPU 310 to perform certain functions, operations, and steps related to embodiments of the present disclosure. Memory 320 may be a magnetic, semiconductor, tape, optical, or other type of storage device. In one embodiment, memory 320 includes one or more software application programs 325 that, when executed by CPU 310, perform various processes consistent with the present disclosure.

Methods, systems, and articles of manufacture consistent with the present disclosure are not limited to programs configured to perform dedicated tasks. For example, memory 320 may be configured with a program 325 that performs several functions consistent with the disclosure when executed by CPU 310. Alternatively, CPU 310 may execute one or more programs located remotely from client 102a. For example, client 102a may access one or more remote programs that, when executed, perform functions related to embodiments of the present disclosure. The configuration and number of programs implementing processes consistent with the disclosure are not critical to the disclosure.

Memory 320 may be also be configured with an operating system (not shown) that performs several functions well known in the art when executed by CPU 310. By way of example, the operating system may be Microsoft Windows™, Unix™, Linux™, an Apple™ operating system such as MAC OSX™, Personal Digital Assistant operating system such as Microsoft CE™, or any other operating system. The choice of operating system, and even the use of an operating system, is not critical to the disclosure.

I/O device(s) 330 may comprise one or more input/output devices that allow data to be received and/or transmitted by client 102a. For example, I/O device 330 may include one or more input devices, such as a network connection, keyboard, touch screen, mouse, microphone, disk reader, and the like, that enable data to be input or received from a user. Further, I/O device 330 may include one or more output devices, such as a network connection, display screen, printer, speaker devices, and the like, that enable data to be output or presented to a user. The configuration and number of input and/or output devices incorporated in I/O device 330 are not critical to the disclosure.

API 340 is an interface used by client 102a to execute user requests. In an embodiment, API 340 may be used in conjunction with I/O device 330 to define, for example, monitoring parameters, events, and notifications with respect to tax returns. In addition, API 340 may query and receive information regarding tax returns in response to information received at I/O device 330. API 340 may also update information stored in databases 206 and 210.

Database 350 may comprise one or more databases that store information and are accessed and managed through system 100. By way of example, database 350 may be an Oracle™ database, a Sybase™ database, or any other relational database.

Figure 4:
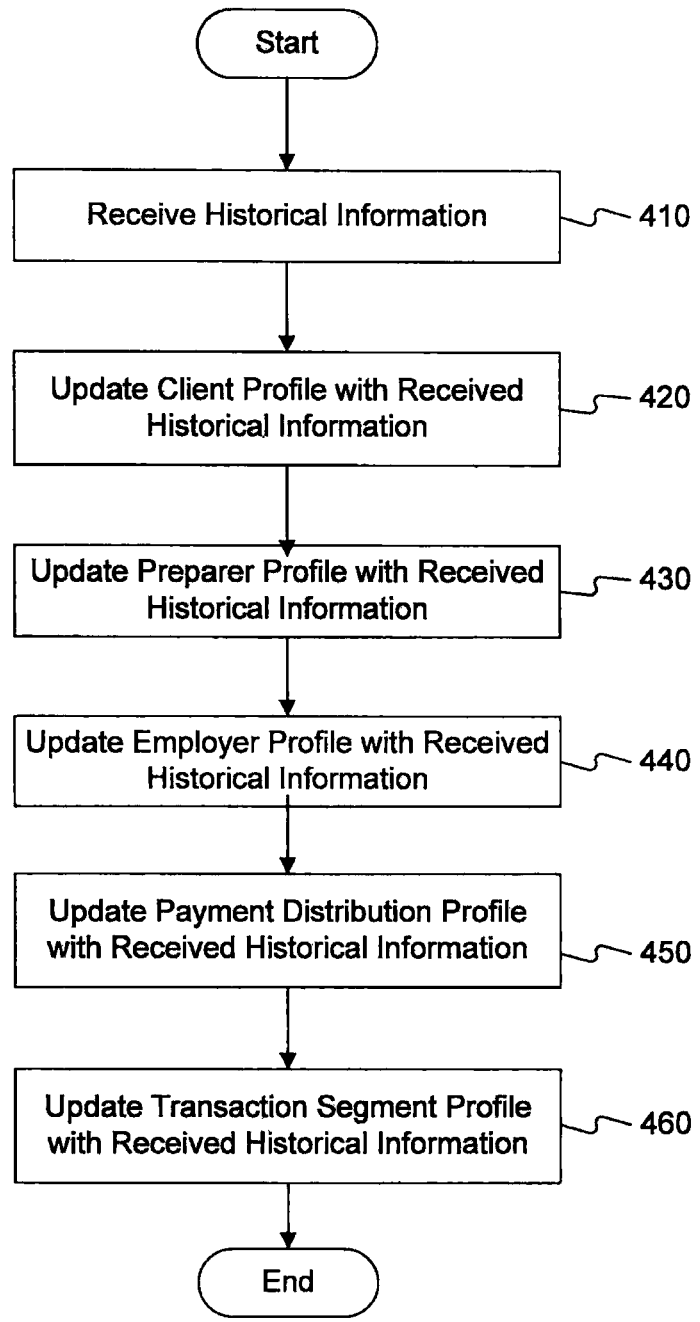
FIG. 4 illustrates a flowchart of an exemplary method for processing historical information consistent with an embodiment of the present disclosure.

FIG. 4 illustrates a flowchart 400 of an exemplary method for processing historical tax information associated with one or more previously filed tax returns in a risk scoring center, consistent with principles of the present disclosure. Although the steps of the flowchart are described in a particular order, one skilled in the art will appreciate that these steps may be performed in a modified or different order, or that certain steps may be omitted or other steps added. Further, one or more of the steps in FIG. 4 may be performed concurrently or in parallel.

Risk scoring center 104 may receive information from one or more clients 102a-102n. The information received by risk scoring center 104 may include, for example, a taxpayer's name, address, social security number, tax ID number, taxable income, number of exemptions, deductions, tax credits, and other such data.

Risk scoring center 104 may receive tax return information for each year a taxpayer files a tax return (step 410). The tax return information from previous years may be viewed as historical tax return information. This historical tax return information may be used by risk scoring engine 208 to determine the risk of fraud associated with information contained in the current tax return.

Based on the historical tax return information associated with a taxpayer, risk scoring engine 104 may update the client profile 212 in risk profile database 210 based on the historical tax return information from each of the previous tax returns that the taxpayer filed (step 420). For example, risk scoring engine 104 may update client profile 212 by storing, for example, the taxpayer's name, address(es), and social security number associated with previous tax returns.

Risk scoring engine 104 may also update the preparer profile 214 in risk profile database 210 with the appropriate preparer, if any, who assisted the taxpayer with preparing the tax return information from previous tax returns that the taxpayer filed (step 430). Risk scoring engine 104 may also update the employer profile 216 in risk profile database 210 with the one or more employers that employed the taxpayer during previous tax returns that the taxpayer filed (step 440).

Risk scoring engine 104 may also update the payment distribution profile 218 in risk profile database 210 with the taxpayer's bank account(s) information and mailing address(es), if any, that the taxpayer listed for receiving a refund check via mail or electronic deposit, or for paying taxes due based on the one or more historical tax returns (step 450). Risk scoring engine 104 may also update the transaction segment profile 220 in risk profile database 210 with the tax payment amount, refund amount, income details, exemption(s) details, standard deductions, and itemized deductions associated with previous tax returns (step 460).

FIG. 5 illustrates a flowchart 500 of an exemplary method for processing current tax return information, comparing the current tax return information with the stored historical tax return information, and determining potential fraud associated with the current tax return information in a risk scoring center, consistent with the principles of the present disclosure. Although the steps of the flowchart are described in a particular order, one skilled in the art will appreciate that in certain embodiments these steps may be performed in a modified or different order, or that certain steps may be omitted or other steps added. Further, one or more of the steps in FIG. 5 may be performed concurrently or in parallel.

Risk scoring center 104 may receive information from one or more clients 102a-102n (step 510). The information received by risk scoring center 104 may include, for example, a taxpayer's name, address, social security number, tax ID number, taxable income, number of exemptions, deductions, tax credits, and other such data. This information may be associated with a current tax return, for example.

After receiving the information regarding a current tax return, risk scoring center 104 may query the information contained in risk profile database 210 associated with the taxpayer who filed the current tax return (step 520).

Risk scoring engine 208 may receive the current tax return information and analyze the information to determine the relevant profile(s) (step 530). Risk scoring engine 208 may determine, for example, that a client profile 212, preparer profile 214, employer profile 216, payment distribution profile 218, and transaction segment profile 220 are relevant to the information contained in the current tax return. Alternatively, risk scoring engine 208 may determine that the current tax return did not list a preparer. Accordingly, risk scoring engine 208 may determine that preparer profile 214 is not relevant to the current tax return. One of ordinary skill in the art would appreciate that any combination of one or more profiles may be relevant to the current tax return.

After determining relevant profiles, risk scoring engine 208 may compare the information in the current tax return with the historical information contained in one or more relevant profiles (step 540).

After comparing the current tax return information with the associated historical tax return information, risk scoring engine 208 may generate one or more risk scores based on the comparison of the current tax return information and the historical information (step 550). This information may be useful to determine if the taxpayer is attempting to fraudulently claim, for example, more dependents, lower taxable income, or more itemized deductions than appropriate. If the taxpayer's current tax return claims more dependents than previous tax returns, risk scoring engine 208 may analyze the difference and determine if there is a risk of fraud associated with this difference. Based on the identified risk, risk scoring engine 208 may determine a risk score.

It addition to the above examples, it is common for individuals to obtain, through purchase or theft, names and social security numbers of other people and file tax returns for these false identities. For example, when using a stolen identity, tax return data such as an address, employer, and refund destination may be different than the stored historical data. Risk scoring engine 208 may detect the changes and may determine a risk score that may indicate a risk of, for example, identity fraud.

A plurality of risk scores may exist, and different types of risk may have different risk scores depending on the identified risk. Each risk score may be compared with a risk score threshold that may be predetermined or customized. For example, each tax season different risk score thresholds may be determined. Conversely, risk score thresholds may be used, unchanged, between tax seasons.

Depending on the risk score determined by risk scoring engine 208, risk scoring engine 208 may determine if the score exceeds the threshold score (step 560). If the score does exceed the threshold score, risk scoring engine may flag the tax return and send one or more alerts to one or more administrators 108a-108n (step 570). Administrators 108a-108n may review the one or more alerts regarding the potential risk of fraud in the tax return, conduct a more detailed analysis of the identified risk, and determine if the taxpayer is attempting to fraudulently file the tax return (step 580).

For example, an average value of income for a taxpayer over a period of five years and an average value of income for all taxpayers who have used a particular preparer over a period of five years may be relevant for determining a risk associated with a particular tax return. The average income values may be calculated and stored in the appropriate risk profile(s) in risk profile database 210 for the taxpayer and preparer before the current tax return is filed. Based on the calculated values, risk scoring engine 208 may look up the values and use them to calculate a corresponding risk score.

While certain features and embodiments of the disclosure have been described, other embodiments of the disclosure will be apparent to those skilled in the art from consideration of the specification and practice of the embodiments of the disclosure disclosed herein. Furthermore, although aspects of embodiments of the present disclosure have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the disclosure.

Moreover, one of ordinary skill would appreciate that the disclosure may be used in other fields in addition to tax returns, such as, for example, insurance claims, visas/immigration, etc.

It is intended, therefore, that the specification and examples be considered as exemplary only, with a true scope and spirit of the disclosure being indicated by the following claims and their full scope of equivalents.

What is claimed is:

1. A computer-implemented method for determining risk, the computer including a processor and memory, and the method comprising:
   Receiving, using the processor, historical information relating to tax return data of a taxpayer;
   updating, using the processor, one or more profiles associated with the historical information;
   receiving, using the processor, current information relating to tax return data of the taxpayer;
   querying, using the processor, the updated historical information based on the received current information;
   processing, using the processor, historical information, received in response to the querying, together with the current information; and
   generating, using the processor, one or more risk scores in response to processing the historical information together with the current information.

2. The method of claim 1, wherein the one or more profiles include at least one of either a client profile, a preparer profile, an employer profile, a payment distribution profile, and a transaction segment profile, or any combination thereof.

3. The method of claim 2, further comprising:
   determining, using the processor, one or more profiles that are relevant to the current information based on the querying.

4. The method of claim 1, further comprising:
   comparing, using the processor, the one or more risk scores to a risk score threshold; and
   determining, using the processor, and based on the comparing, if the one or more risk scores exceeds the risk score threshold.

5. The method of claim 4, further comprising:
   transmitting, using the processor, an alert, if at least one of the one or more risk scores exceeds the risk score threshold.

6. The method of claim 1, wherein the historical information includes tax return data associated with one or more previously filed tax returns.

7. A computer-readable recording medium storing a computer-executable program which, when executed by a processor, performs a method for determining risk comprising:
   Receiving historical information relating to tax return data of a taxpayer;
   updating one or more profiles associated with the historical information;
   receiving current information relating to tax return data of the taxpayer;
   querying the updated historical information based on the received current information;
   processing historical information, received in response to the querying, together with the current information; and
   generating one or more risk scores in response to processing the historical information together with the current information.

8. The computer-readable recording medium of claim 7, wherein the one or more profiles include at least one of either a client profile, a preparer profile, an employer profile, a payment distribution profile, and a transaction segment profile, or any combination thereof.

9. The computer-readable recording medium of claim 8, further comprising:
   determining one or more profiles that are relevant to the current information based on the querying.

10. The computer-readable recording medium of claim 7, further comprising:
    comparing the one or more risk scores to a risk score threshold; and determining, based on the comparing, if the one or more risk scores exceeds the risk score threshold.

11. The computer-readable recording medium of claim 10, further comprising:
    transmitting an alert, if at least one of the one or more risk scores exceeds the risk score threshold.

12. The computer-readable recording medium of claim 7, wherein the historical information includes tax return data associated with one or more previously filed tax returns.

13. A system for determining risk, comprising:
    a risk scoring center in communication with one or more clients including data, wherein the risk scoring center includes a processor and a memory, the memory including instructions which, when executed on the processor perform a method, the method comprising:
    receiving the data from at least one of the one or more clients, the data including historical information relating to tax return data of a taxpayer;
    updating one or more profiles associated with the historical information;
    receiving current information relating to tax return data of the taxpayer;
    querying the updated historical information based on the received current information;
    processing historical information, received in response to the querying, together with the current information; and
    generating one or more risk scores in response to processing the historical information together with the current information.

14. The system of claim 13, wherein the one or more profiles include at least one of either a client profile, a preparer profile, an employer profile, a payment distribution profile, and a transaction segment profile, or any combination thereof.

15. The system of claim 14, wherein the risk scoring center: determines one or more profiles that are relevant to the current information based on the querying.

16. The system of claim 13, wherein the risk scoring center:
    compares the one or more risk scores to a risk score threshold; and
    determines, based on the comparison, if the one or more risk scores exceeds the risk score threshold.

17. The system of claim 16, wherein the risk scoring center:
    transmits an alert if at least one of the one or more risk scores exceeds the risk score threshold.

18. The system of claim 13, wherein the historical information includes tax return data associated with one or more previously filed tax returns.

19. An apparatus for determining risk comprising:
    A processor; and
    A memory coupled to the processor configured with instructions which, when executed on the processor, perform a method for determining risk, the method comprising:
    receiving historical information relating to tax return data of a taxpayer;
    updating one or more profiles associated with the historical information;
    receiving current information relating to tax return data of the taxpayer;
    querying the updated historical information based on the received current information;
    processing historical information, received in response to the querying, together with the current information; and
    generating one or more risk scores in response to processing the historical information together with the current information.

20. The apparatus of claim 19, the method further comprising:
    comparing the one or more risk scores to a risk score threshold;
    determining, based on the comparing, if the one or more risk scores exceeds the risk score threshold; and
    transmitting an alert, if at least one of the one or more risk scores exceeds the risk score threshold.

* * * * *